United States Patent [19]

Pizzi et al.

[11] Patent Number: 5,407,980
[45] Date of Patent: Apr. 18, 1995

[54] ADHESIVE COMPOSITION COMPRISING ISOCYANATE PHENOL-FORMALDEHYDE AND TANNIN, USEFUL FOR MANUFACTURING PLYWOODS FOR EXTERIOR APPLICATION

[75] Inventors: Antonio Pizzi, Johannesburg, South Africa; Ernst Von Leyser; Cristian Westermeyer, both of Concepcion, Chile

[73] Assignees: Diteco Ltda; Quimicos Coronel S.A., both of Chile

[21] Appl. No.: 976,357

[22] Filed: Nov. 18, 1992

[51] Int. Cl.⁶ .................... C08L 99/00; C08G 4/00; C08G 18/06
[52] U.S. Cl. ........................... 524/73; 524/14; 524/74; 524/590; 524/597; 527/401; 527/403; 528/232; 528/243
[58] Field of Search ............... 524/13, 14, 72, 73, 524/74, 590, 597; 528/219, 249; 527/401, 403

[56] References Cited

U.S. PATENT DOCUMENTS

| | | | |
|---|---|---|---|
| 3,254,038 | 5/1966 | Duncan et al. | 524/72 |
| 4,048,103 | 9/1977 | Graham | 528/48 |
| 4,246,157 | 1/1981 | Laitar | 528/155 |
| 4,698,377 | 10/1987 | Laitar | 524/317 |
| 4,968,771 | 11/1990 | Baxter | 524/376 |

FOREIGN PATENT DOCUMENTS 3336539 4/1985 Germany.

*Primary Examiner*—Tae H. Yoon
*Attorney, Agent, or Firm*—Cushman, Darby & Cushman

[57] ABSTRACT

The present invention relates to an adhesive composition for manufacturing plywood for exterior application including:
 a) 121 parts by weight phenolic resin;
 b) 5 to 121 parts by weight isocyanate;
 c) 1 to 40 parts by weight tannin selected from the group consisting of pine, quebracho, mimosa, and combinations thereof;
 d) 1 to 15 parts by weight paraformaldehyde or formaldehyde solutions in water;
 e) 5 to 50 parts by weight of water; and
 f) an amount of filler comprising inorganic and/or organic materials for providing the composition with the desired viscosity.

6 Claims, 8 Drawing Sheets

ADHESIVE COMPOSITION COMPRISING ISOCYANATE PHENOL-FORMALDEHYDE AND TANNIN, USEFUL FOR MANUFACTURING PLYWOODS FOR EXTERIOR APPLICATION

BACKGROUND OF THE INVENTION

This application is a Continuation-in-part of application Ser. No. 07/802,642, filed Dec. 9, 1991, now abandoned the entire contents of which are hereby incorporated by reference.

The present invention relates, in general, to an adhesive composition which is of high quality and which can compete in the international market. More specifically, the invention relates to an adhesive composition comprising isocyanate-phenolformaldehyde-tannin, useful for manufacturing plywoods for exterior applications with both small wood tulips and Pinus radiata.

Plywood has been known for many centuries. Originally, it was produced by artisans preparing furniture from veneers of very expensive timbers to save on the amount of wood required to be used. Only adhesives of animal or vegetal origin were used, as these were the only types available.

Since the beginning of this century, plywood has been produced industrially due to its exceptional strength to weight ratio. At first, the only adhesive utilized was casein, an animal derived protein. However, beginning in the 1930's the introduction of synthetic resins, namely, urea-formaldehyde (UF) adhesives for interior applications and phenol-formaldehyde (PF) adhesives for exterior and marine-grade applications, revolutionized plywood manufacturing. The use of synthetic resins in the manufacturing process yielded plywood that was of consistent quality and was available at affordable prices. A great expansion of its worldwide production capacity ensued, which expansion continued well after the end of the second world war.

At present PF resins dominate the worldwide market for the production of exterior and marine grade plywood. However, PF resins present a problem in that a variety of formulations are employed due to the very different types of wood used for veneers. Furthermore, PF resins have some serious limitations. For instance, they are not able (i) to consistently bond veneers of higher moisture content (8% to 12%), (ii) to bond equally well with the same formulation medium density veneers and high density veneers (0.6 to 0.8 Kg/m$^3$) into structural plywood and to accomplish all the above with lower adhesive spread levels. A resin of any nature or composition which is capable of overcoming all the defects of PF resins listed above, while still maintaining their excellent performance, would indeed be a great step forward in adhesives for exterior and marine grade plywood.

Diisocyanates (in particular, polymeric MDI) have been known in the wood industry for almost 15 years. These materials can produce excellent results when used as adhesives for particulate products but have been widely recognized as totally unsuitable for plywood. This is due to their low viscosity which makes these resins migrate from the glue-line into the veneers before and, more particularly, during plywood hot-pressing operations. This results in completely starving the glue-line of adhesive and leading to joints of very poor strength. A composite resin containing MDI which would be capable of utilizing the great strength capabilities of MDI, but capable to also bonding plywood would become as successful in the field of plywood manufacture as MDI is successful today in bonding wood particle products.

Tannin-formaldehyde resins have been another set of adhesives which has been used commercially, in certain countries, during the last 20 years. Their exterior durability and their performance is similar and often superior to that of PF resins, which they resemble due to the phenolic nature of polyflavonoid condensed tannins obtained from the bark and wood of certain trees. Up to now however, only mimosa (wattle), quebracho and chestnut tannins have been used commercially for plywood adhesives application. While they perform well on softwoods, they perform poorly on the higher densities hardwood veneers.

Furthermore their limited worldwide production, not more than 150,000 tons per year, has severely limited their ability to make serious quantitative inroads in the worldwide PF wood adhesives market which is reputed to be of up to 5 million tons yearly. The only tannin which could be produced in such large scale is that obtainable from the bark of pine trees.

Pine trees are the most common forestry crop worldwide and, thus, great amounts of waste pine bark are available. This could be the potential source of considerable amounts of pine tannin. Unfortunately pine tannins are reputed to be not easily amenable to the formulation of wood adhesives as some of the other tannins mentioned above. No present successful industrial use is at present recorded.

Thus, the preparation of a composite adhesive system using in bulk the characteristics of MDI, of pine tannins and of PF resins to overcome at the industrial level most of the problems listed for the three materials when used singly is then a great step forward in the formulation of industrial plywood adhesives.

OBJECTS OF THE PRESENT INVENTION

It is an object of the present invention to provide an adhesive composition useful for manufacturing plywoods.

It is another object of the present invention to provide an adhesive composition comprising isocyanate-phenolformaldehyde-tannin, useful for manufacturing plywoods for exterior applications with both small wood tulips and Pinus radiata.

Further objects and advantages of the present invention will be apparent by the description of the embodiments that follow.

BRIEF DESCRIPTION OF THE DRAWINGS

FIGS. 1, 3 and 5 show shear strength, FIGS. 2, 4 and 6 show adhesion average, FIGS. 7 and 9 show tensile strength.

DETAILED DESCRIPTION OF THE INVENTION

Raw, non-emulsifiable, polymeric MDI (4,4'-diphenylmethane diisocyanate) has been used industrially for the production of particle board for quite sometime (Deppe and Ernst, 1971; Deppe, 1977 a,b; Sachs, 1977; Wittmann, 1976; Johns, 1980; Wilson, 1980; Adams, 1980; McLaughlin, 1980). Its inherent characteristics however, namely very low viscosity and very high mobility at elevated temperature, render impossible its industrial and laboratory application to plywood manufacture (Ball and Redman, 1978). Today no plywood is or can be manufactured with MDI adhesives.

Systems which were mooted approximately a decade ago (Pizzi, 1981, 1982; Dix and Marutzky, 1989) and which indicated that MDI could also be used successfully for exterior and marine plywood were not followed up industrially until recently. The reason for this was the lack of understanding of the novel reaction mechanisms involved, which ensured disregard from the polyurethane specialists.

Furthermore, in the field of timber adhesives it has traditionally been thought that a non-emulsified MDI cannot be used in water systems as it reacts with water to "deactivate" by forming polyureas, without forming urethanes with the polyols present in water solution (Pizzi, 1981, 1982; Johns, 1989). However, the real question which should be asked is, at what rate does MDI react with water in relation to the other components, such as the polyols present in water solution.

Up to the present, knowledge of diisocyanates and polyurethane chemistry led to the belief that in mixed resins containing MDI/phenol-formaldehyde (PF), or MDI/melamine-formaldehyde (MF) and MID/urea-formaldehyde (UF) resins the isocyanate group can react not only with water but also with the phenolic hydroxy groups of phenol of a PF resin, and possibly with the amidic groups of urea and melamine resins. In reality, the latter reactions are slower than the reaction of MDI with water, and, thus, such a system would largely lead to MDI deactivation, which is what has always been believed (Ball & Redman, 1978).

What has always been disregarded is that the isocyanate group (—N—C—O) can and does react extremely rapidly with the methylol group (hydroxybenzyl alcohol group =—CH$_2$OH) present in PF resols and with the equally reactive methylol group present in MF and UF resins. The initial results shown in Table 1 indicate that this is indeed the case. Thus, the rate constants shown in Table 1 indicate that the reaction of the isocyanate group of MDI with methanol, with the —CH$_2$OH groups of PF resins (rate constant k obtained for homosaligenin-orthohydroxybenzylacohol, as well as for a PF resin) and of MF and UF resins occurs readily.

Thus, in a resin system composed, for instance, of 30 parts MDI, 70 parts resin solids of a PF, MF or UF resin, 60 parts water, 5-10 parts flavonoid tannin accelerator (for the PF resin; coupled to 1-1,5 parts paraformaldehyde) the greater proportion of MDI present may not be, and is not, deactivated by water.

The composition according to the present invention comprises:
a) 121 parts by weight phenolic resin;
b) 5 to 121 parts by weight isocyanate;
c) 1 to 40 parts by weight tannin selected from the group consisting of pine, quebracho, mimosa, and combinations thereof;
d) 1 to 15 parts by weight paraformaldehyde or formaldehyde solutions in water;
e) 5 to 50 parts by weight of water; and
f) an amount of filler comprising inorganic and/or organic materials for providing the composition with the desired viscosity.

The adhesive composition may comprise 121 parts by weight of phenolic resin, 30 parts by weight of isocyanate (MDI), 10 parts by weight of pine tannin, 1 part by weight of paraformaldehyde, 10 parts by weight of wood flour and 17 parts by weight of water. Preferably, the filler is wood flour.

Preferably, the adhesive composition comprise is 5 to 50 parts by weight isocyanate. The adhesive composition may further preferably comprise 1 to 10 parts by weight tannin. The adhesive composition may preferably comprise 1 to 5 parts by weight of paraformaldehyde or formaldehyde solutions in water.

The phenolic resin preferably may be prepared from 44.98% phenol, 26.30% paraformaldehyde, 19.19% water/methanol and 9.57% soda, but any phenolic resin can be used.

Taking into account the main components of the adhesive composition of the invention, the way in which it operates can be explained as follows: the isocyanate reacts with the phenolic resin, where each one of these two components fortifies and partly hardens the other; the isocyanate groups react with the phenolic hydroxyl groups as well as with the methylol hydroxy groups of the phenol-formaldehyde resin. The tannin functions as an accelerator of the reaction and must be used in lesser amount in order to maintain this role in the compositions; it works as an accelerator because it reacts with the reactive methylol groups of the phenol-formaldehyde resin and, therefore, it is also a hardener and cross-linker of the phenol-formaldehyde resin; it acts as an accelerator because it is also a phenolic material, but containing natural phenols of a type ten times more reactive than the phenol-formaldehyde resin.

The overall balance of hardener would be deficient for obtaining a hard gel and, therefore, an extra amount of paraformaldehyde is added. This compound is mainly a hardener and hardening aid for the tannin accelerator, as the other two polymers can be polymerized and hardened with themselves (for instance, as in the case of the phenol-formaldehyde resin) or slowly with the water of the system (for instance, as in the case of isocyanate).

In summary, the isocyanate reacts with the phenol-formaldehyde resin, with the tannin, with the water and, probably, with the paraformaldehyde. The phenol-formaldehyde resin reacts with the isocyanate, with the tannin and with the paraformaldehyde; and the tannin reacts with the isocyanate, with the phenol-formaldehyde resin and with the paraformaldehyde.

The compositions of the invention can be used in the manufacture of plywood. The present invention demonstrates excellent results with different timber species, and operates in the same manner with all types of wood (hardwood and softwood), which is not achieved with the phenol-formaldehyde resins.

Furthermore, the composition is highly resistant to small tulips (wood) penetration and has a good flow with viscosities up to 5000 cps, something which is not possible with known compositions.

From the initial results in Table 1 and the more exact results in Tables 2 and 3, the methylols-carrying PF resol (or saligenin as its simplest model compound) can undergo two reactions of almost equal rate. One reaction is the standard condensation reaction that PF resols undergo to cross-link through methylene (—CH$_2$—) bridges. This reaction is very slow by itself, but when an accelerator is added to the phenolic resin, such as polyflavonid tannin (PF—CH$_2$OH: Catechin case, Table 1), it becomes very fast.

The second reaction involves the attachment of the MDI on the hydroxyl of the methylol group —CH$_2$OH present on the PF resol. In such a system the reaction of MDI with water to deactivate the MDI by forming polyureas is much slower. These results appear to infer that deactivation of MDI by water is small in such a system and that urethane formation does indeed occur, a result born out both by IR kinetic studies and by the bonding results reported later. In the case of PF resols the mechanism proposed for the total reaction system is:

existence of this or of the alternative reaction illustrated later. Reaction of monomeric MDI with saligenin yielded a compound of formula The structure of the above formula was confirmed by mass spectrometry and $C^{13}$ NMR. In this model compound the total absence of the —NCO band at 2250 $cm^{-1}$ is also a clear indication that a urethane bond was formed.

Formula II can be further cross-linked by —CH$_2$— by reaction with more of Formula I, by reaction of MDI with the phenolic hydroxy group and by further reaction of MDI with the —NH— groups in the PF/MDI urethane bond formed.

From the I.R. spectra following the reaction at different temperatures, particularly at temperatures equal or higher than 60° C. it can be observed that concomitantly (i) a marked decrease of the —NCO band at 2250 $cm^{-1}$ occurs, (ii) a marked decrease of the —OH band characteristic of the —CH$_2$OH group in homosaligenin (3150 $cm^{-1}$) and in reaction with methanol while the band at 3400 $cm^{-1}$ corresponding to the phenolic —OH does not, or hardly does, vary. In UF resins, however, the main indication that a reaction occurs appears to be the appearance after a few minutes of reactions of a very strong, new C═O bond. This may indicate the With respect to the 5–10% flavonoid tannin, this is often used in the acceleration of PF resins. Here, the fastest reaction is the initial attack on the A-ring of the flavonoid tannin to form methylol groups. This reaction will initially dominate the whole system. The methylol groups on flavonoid tannins are much more unstable and reactive than the PF resin groups. Once formed they undergo the same two reactions, with the —N═C═O group of MDI, and of cross-linking by —CH$_2$- methylene bridges as noticed for the PF, MR and UF resins. The scheme they follow is shown below.

In addition, the reaction between the —CH$_2$OH of the PF resin and the flavonoid A-ring (flavonoid =Catechin, Table 1) is the normal reaction used to accelerate the cross-linking, by tannins, of PF resol thermosetting adhesives for wood.

-continued

Catechin-MDI polyurethane

In conclusion, raw, polymeric, non-emulsifiable and non-emulsified diisocyanates such as polymeric and monomeric MDI do react preferentially, even in the presence of an excess of water, with selected —OH groups of polyols present in water solution, with minimal deactivation by water to polyurea. Thus, phenol-formaldehyde resols (the higher the amount of methylols on the resin the easier the reaction with MDI) react much faster through their methylol groups to form urethane bonds, then MDI can react with water.

The mechanisms of the reactions involved are complex. However, such a system of resin and cured network formation constitutes an alternative, but parallel and simultaneous, cross-linking mechanism to the classical cross-linking of formaldehyde-based resins through methylene bridge formation. The cured resins prepared through this system are much cheaper than MDI and due to their highly cross-linked nature, are also much stronger. They also lead to the application of MDI as an adhesive for plywood manufacture at the industrial level, which has never been achieved before.

TABLE 1

| Reagents | Reagent Molar Ratio | Temperature (C) | Rate Constant k ($lxmole^{-1} \times sec^{-1}$) |
|---|---|---|---|
| Catechin:HCHO— —CH$_2$OH | 1:1 | 40 | $10.00 \times 10^{-2}$ |
| MDI: CH$_3$OH | 1:2 | 40 | $4.03 \times 10^{-4}$ |
| Catechin —CH$_2$OH: Catechin- —CH$_2$— | 1:1 | 40 | $3.5 \times 10^{-4}$ |
| PF—CH$_2$OH: Catechin- —CH$_2$— | 1:1 | 40 | $3.5 \times 10^{-4}$ |
| PF—CH$_2$OH:MDI | 1:2 | 40 | $1.0 \times 10^{-4}$ |
| MDI: H$_2$O | 1:85 | 40 | $7.38 \times 10^{-5}$ |
| MDI:Phenol(Phenolic-OH) | 1:2 | 40 | $6.36 \times 10^{-5}$ |
| MDI:formaldehyde | 1:2 | 40 | $1.27 \times 10^{-5}$ |
| MDI:Catechin (no HCHO present) | 2:1 | 40 | $2.05 \times 10^{-7}$ |
| PF—CH$_2$OH:Phenol- —CH$_2$— | 1:2 | 40 | $6.2 \times 10^{-7}$ |

TABLE 2

Apparent rate constants of the reaction of polymeric MDI's diisocyanate groups with water, methanol, saligenin (ortho-hydroxybenzyl alcohol) obtained experimentally.

| Temperature (C) | Water k ($lxmole^{-1} \times sec^{-1}$) | Methanol k ($lxmole^{-1} \times sec^{-1}$) | Saligenin k ($lxmole^{-1} \times sec^{-1}$) |
|---|---|---|---|
| 22 | — | $1.44 \times 10^{-5}$ | $1.94 \times 10^{-5}$ |
| 30 | — | $3.32 \times 10^{-5}$ | $3.73 \times 10^{-5}$ |
| 40 | $4.12 \times 10^{-5}$ | $8.38 \times 10^{-5}$ | $8.42 \times 10^{-5}$ |
| 60 | $1.10 \times 10^{-5}$ | $2.11 \times 10^{-4}$ | $4.29 \times 10^{-4}$ |
| 80 | $2.92 \times 10^{-5}$ | — | — |
| 90 | $4.76 \times 10^{-5}$ | — | — |

TABLE 3

Apparent rate constants of (i) total reaction ($k_0$) of MDI with homosaligenin, of (ii) reaction of MDI/saligenin's —NCO group with —CH$_2$OH ($k_1$). The reaction described by $k_1$ is very slow at 22° C. and also at 30° C.

| Temperature (°C.) | $k_0$ ($lxmole^{-1} \times sec^{-1}$) | $k_1$ ($lxmole^{-1} \times sec^{-1}$) |
|---|---|---|
| 22 | $1.85 \times 10^{-5}$ | — |
| 30 | $3.79 \times 10^{-5}$ | — |
| 40 | $9.09 \times 10^{-5}$ | $8.42 \times 10^{-5}$ |
| 60 | $4.12 \times 10^{-4}$ | $4.29 \times 10^{-4}$ |

The following examples are presented in order to illustrate the invention without limiting its scope.

EXAMPLE 1

Adhesive compositions 1, 2 and 3 were prepared comprising the compounds shown in Table A:

TABLE A

| ITEM | 1[(2)] | 2 | 3 |
|---|---|---|---|
| PHENOL RESIN | 121 P.P | 121 | 121 |
| ISOCYANATE (MDI) | 30 | 27.5 | 15 |
| PINE TANNIN | 10 | 7.5 | 10 |
| PARAFORMALDEHYDE | 1 | 6.75 | 1 |
| WOOD FLOUR | 10[(1)] | 10 | 20 |
| WATER | 17 | 17 | 34 |

Plywoods were prepared using compositions 1, 2 and 3, with the following working conditions:
Woods: Tulips of Tepa, coigue, ulmo and pine
Small tulip moisture: 8-10%
Small tulip thickness: 2.1 and 3.6 mm.
Adhesive charge: 200g/m$^2$ (for glue-line)
Previous Press Time: 6'30''
Press Time: 14'
Press Temperature: 120° C.
Press Pressure: 11 Kg/cm$^2$

COMPARATIVE EXAMPLE

Assays were performed in order to obtain the average values of the adhesion percentages (APA standard) and shear (DIN Standard) with the plywoods obtained with adhesive compositions 1, 2 and 3 of the Example according to the invention and with plywoods manufactured with other adhesives according to Table B:

TABLE B

| PLYWOOD | ADHESIVE |
|---|---|
| A | COMPOSITION 1 |
| B | NESTE-OY PHENOLIC, FINLAND |
| C | OXIQUIM PHENOLIC, CHILE |
| D | CIBA-GEIGY PHENOLIC, ENGLAND |
| E | COMPOSITION 2 |
| F | COMPOSITION 3 |

The DIN standard demands a shear which is 1 N/mm$^2$ or higher and the APA standard demands an adhesive average of 80% or more.

Figure 1:
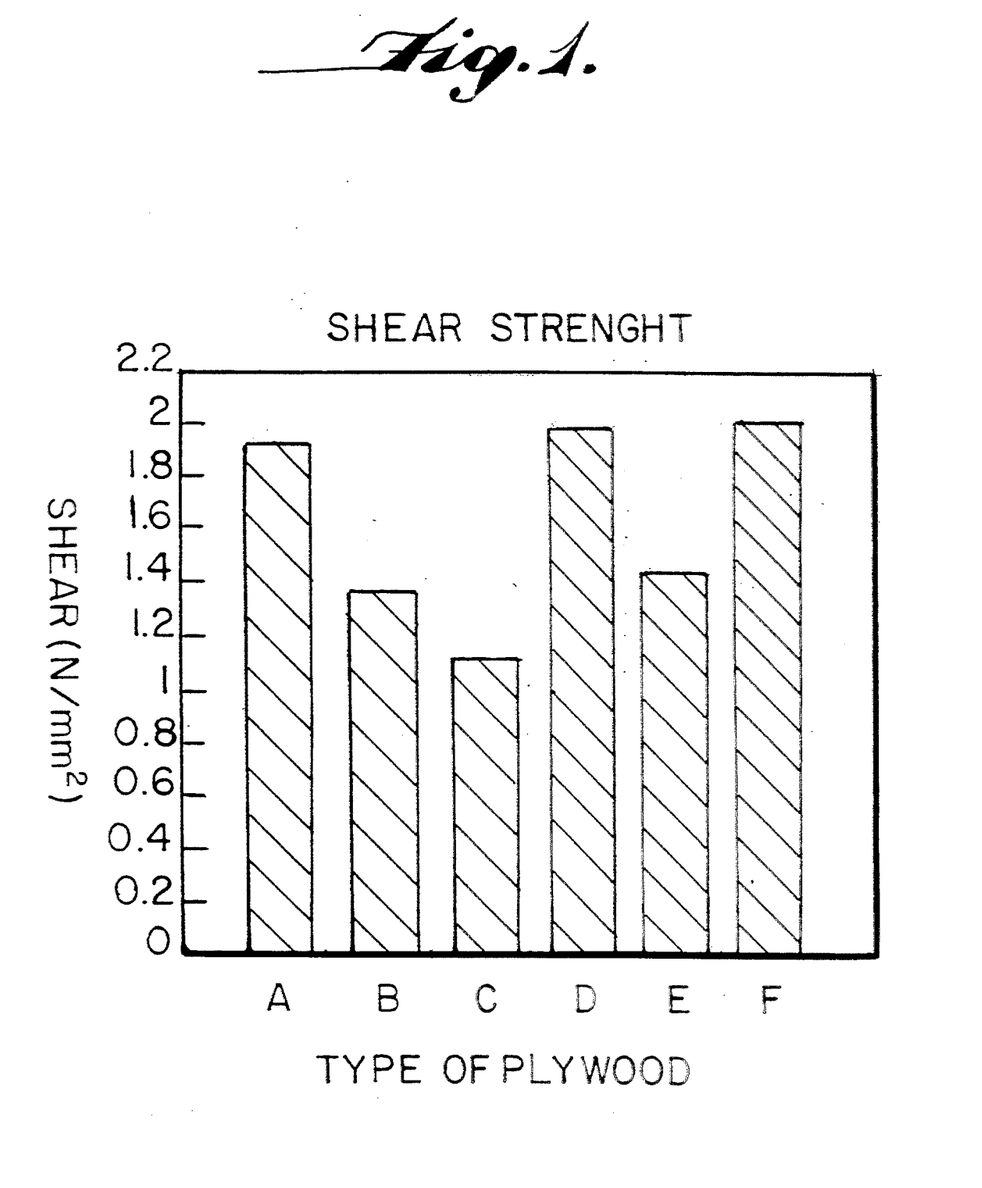
Figure 2:
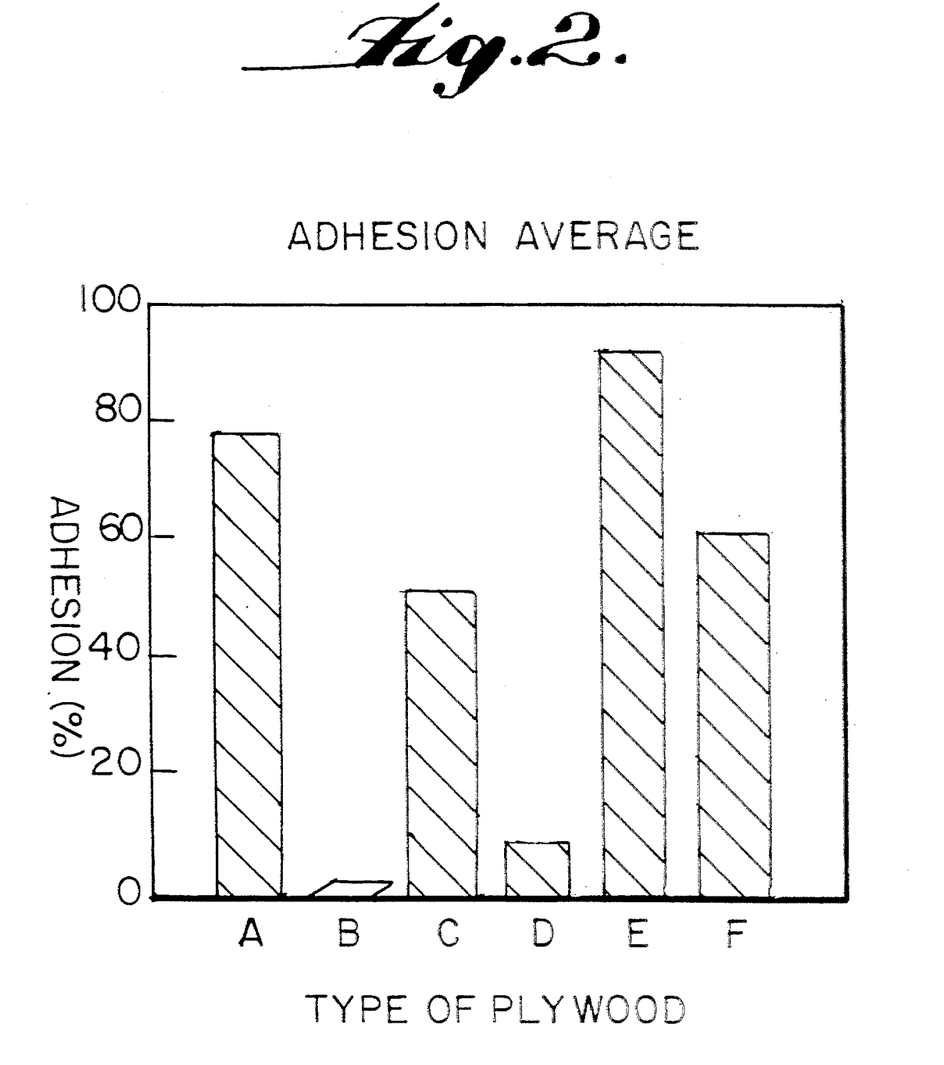

All the plywoods have shear values which are higher than 1 N/mm$^2$, as can be seen from FIG. 1. Only plywoods A and E, manufactured with compositions 1 and 2 of the invention, respectively, achieved the APA standard, as can be seen from FIG. 2.

PILOT PLANT ASSAY 1

Assays were performed in order to measure the shear and adhesive values in plywoods manufactured in the pilot plant using compositions 2 and 3 of the Example according to the invention. Results are shown in Table C and are graphically presented in FIGS. 3 and 4.

TABLE C

| PLYWOOD | | SHEAR (N/mm$^2$) | ADHESIONS (%) |
|---|---|---|---|
| 1 | (a) | 4.34 | 94.50 |
| 1' | (b) | 4.34 | 97.00 |
| 1 II | (c) | 3.89 | 96.00 |
| 1 III | (d) | 3.70 | 100.00 |
| 1,5 | (e) | 3.53 | 77.50*** |
| 1,5 | (f) | 4.34 | 96.00 |
| 1.5 II | (g) | 4.31 | 88.00 |
| 1.5 III | (h) | 3.67 | 92.00 |
| 2 | (i) | 3.42 | 60.00*** |
| 2' | (j) | 3.46 | 98.50 |
| 2 II | (k) | 3.95 | 95.00 |
| 2 III | (l) | 3.14 | 89.00 |

***: NOT APPROVED BY THE STANDARD.

Figure 3:
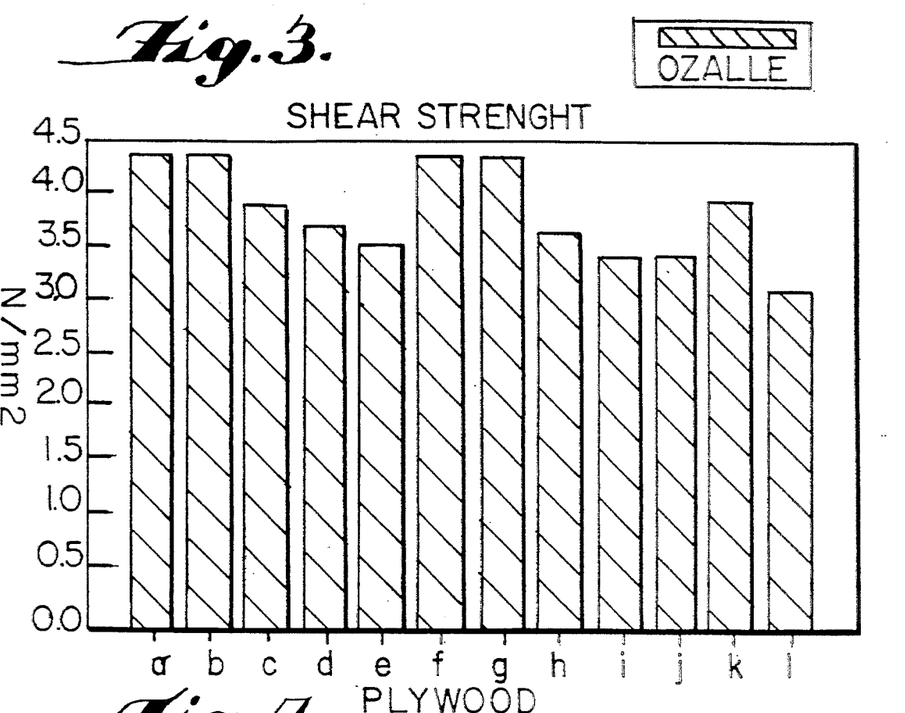
Figure 4:
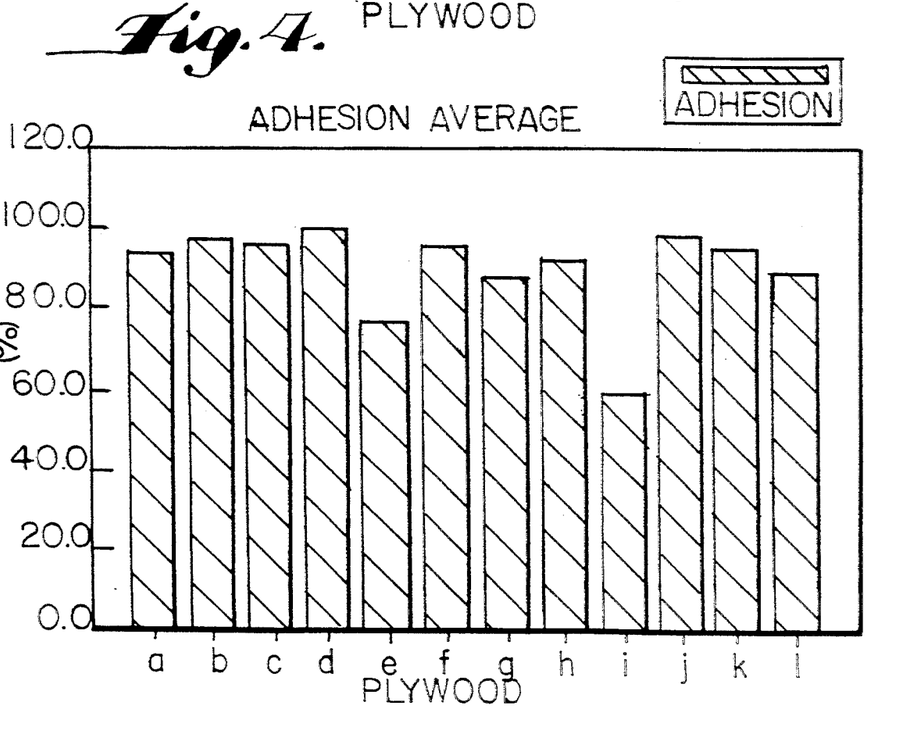

It can be noted that the shear resistance results are all higher than 3N/mm$^2$, thus largely exceeding the DIN standard. The adhesive values are high and, with the exception of the boards, they exceed the 85% of adhesiveness. Therefore, the average of the boards may be accepted according to the APA standard.

INDUSTRIAL ASSAY 1

For this industrial assay, compositions 1 and 2 of the Example according to the invention were applied to pine, tepa, coigue and "olivillo" small tulips under the conditions specified in Table D.

TABLE D

| | | PROCESS CONDITIONS | | | | |
|---|---|---|---|---|---|---|
| Assay | Composition | Press. Temp. (°C.) | Press. Time (MIN) | Press Pressure (Kg/cm$^2$) | Charge (*) (Kg/cm$^2$) | Press. Time (MIN) | Open Time (MIN) |
| 01 | 1 | 125 | 16 | 11 | 480 | 7 | 100 |
| 02 | 1 | 125 | 16 | 11 | 480 | 7 | 30 |
| 03 | 1 | 125 | 12 | 11 | 400 | 7 | 30 |
| 04 | 1 | 125 | 16 | 11 | 400 | 7 | 70 |
| 06 | 2 | 125 | 16 | 11 | 400 | 7 | 35 |
| 07 | 2 | 125 | 16 | 11 | 360 | 7 | 35 |
| 08 | 2 | 125 | 16 | 11 | 360 | 7 | 35 |

(*): AT 2 GLUE LINES.

Figure 5:
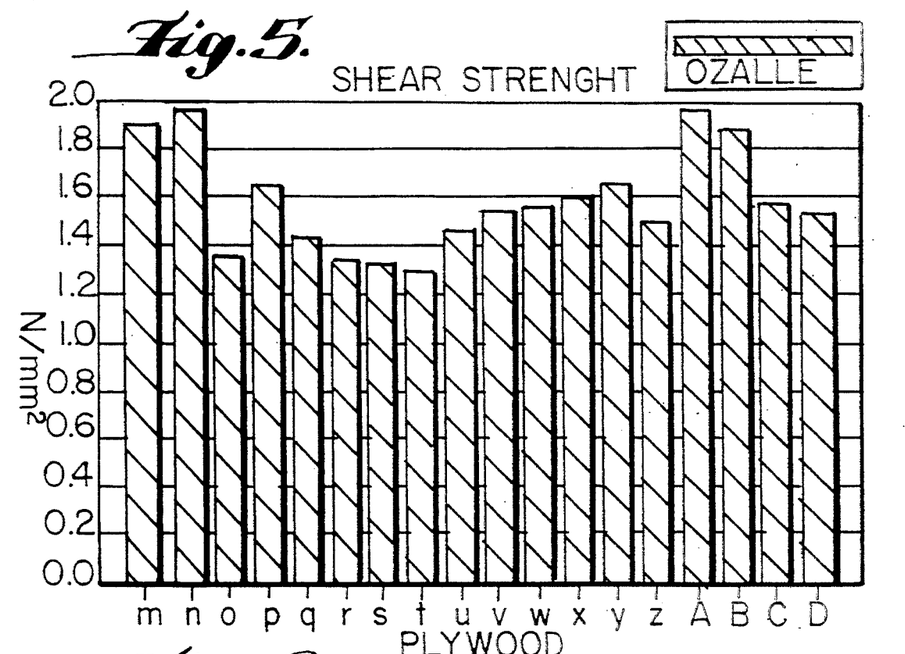
Figure 6:
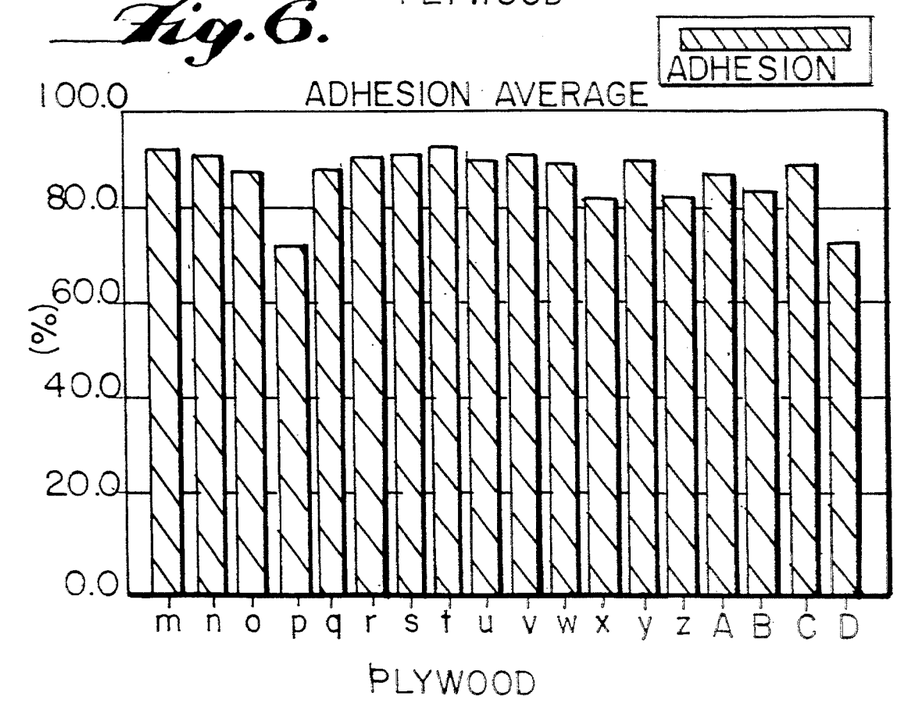
Figure 7:
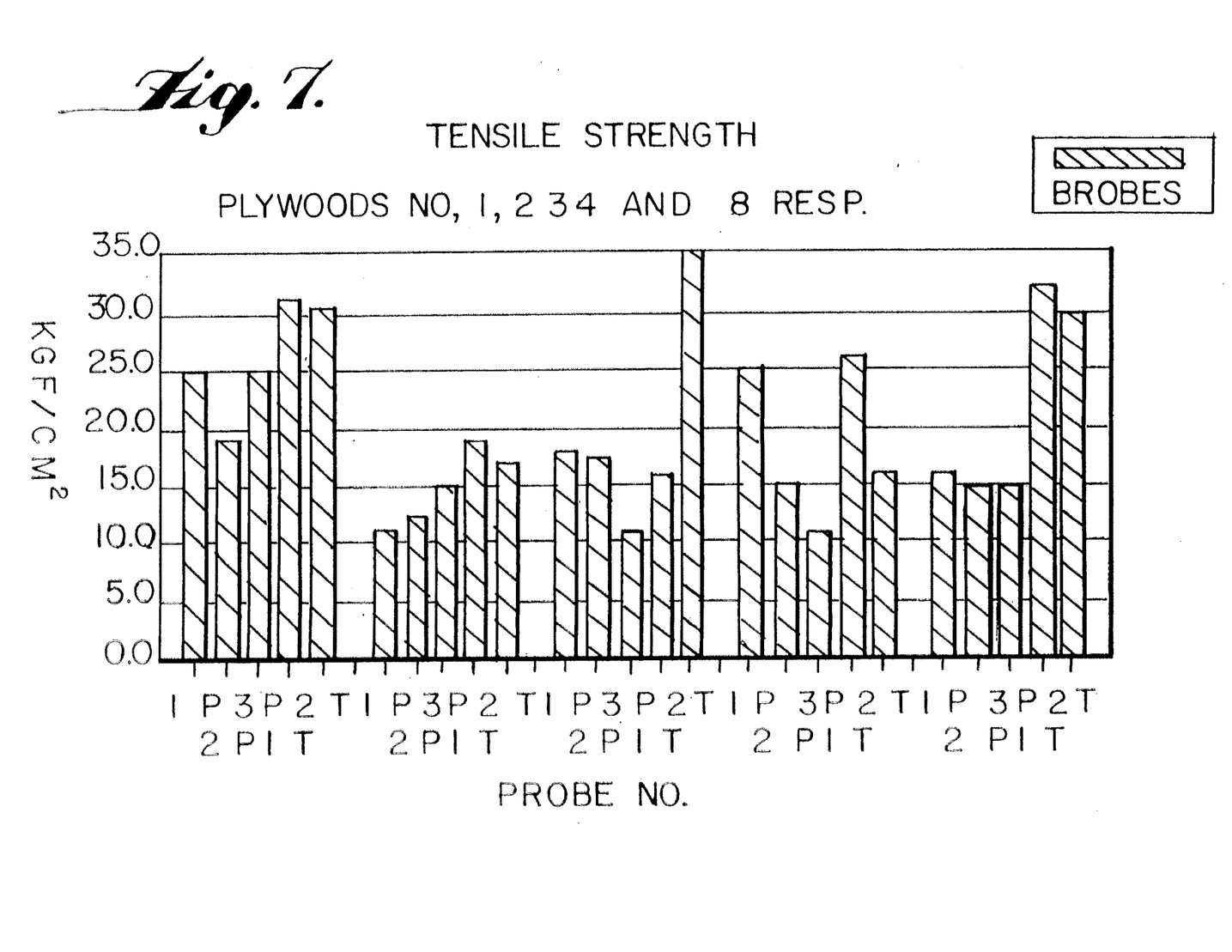
Figure 8:
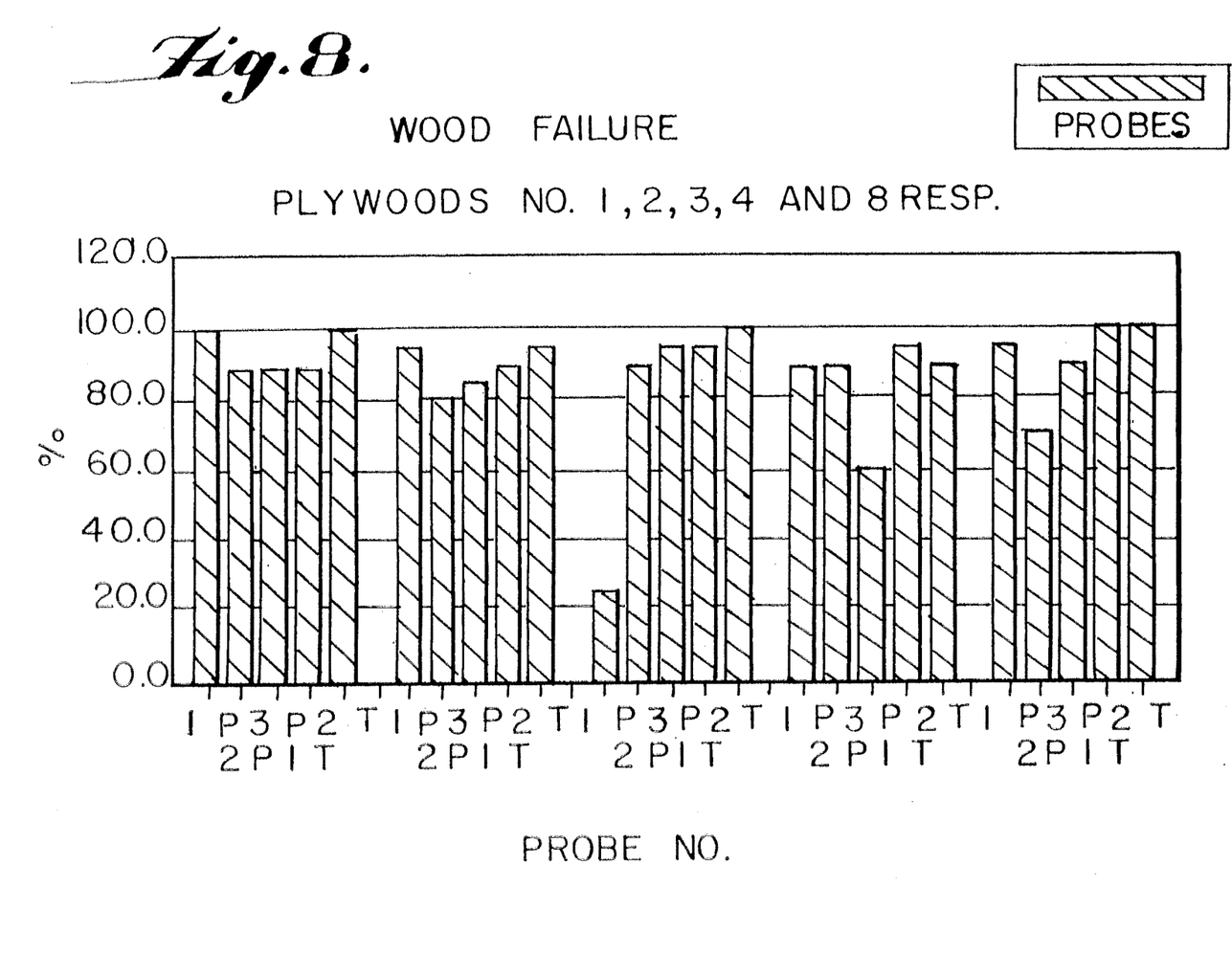
FIGS. 8 and 10 show wood failure of various adhesive compositions in plywood. Data of plots in figures are taken from examples shown hereafter.
Figure 9:
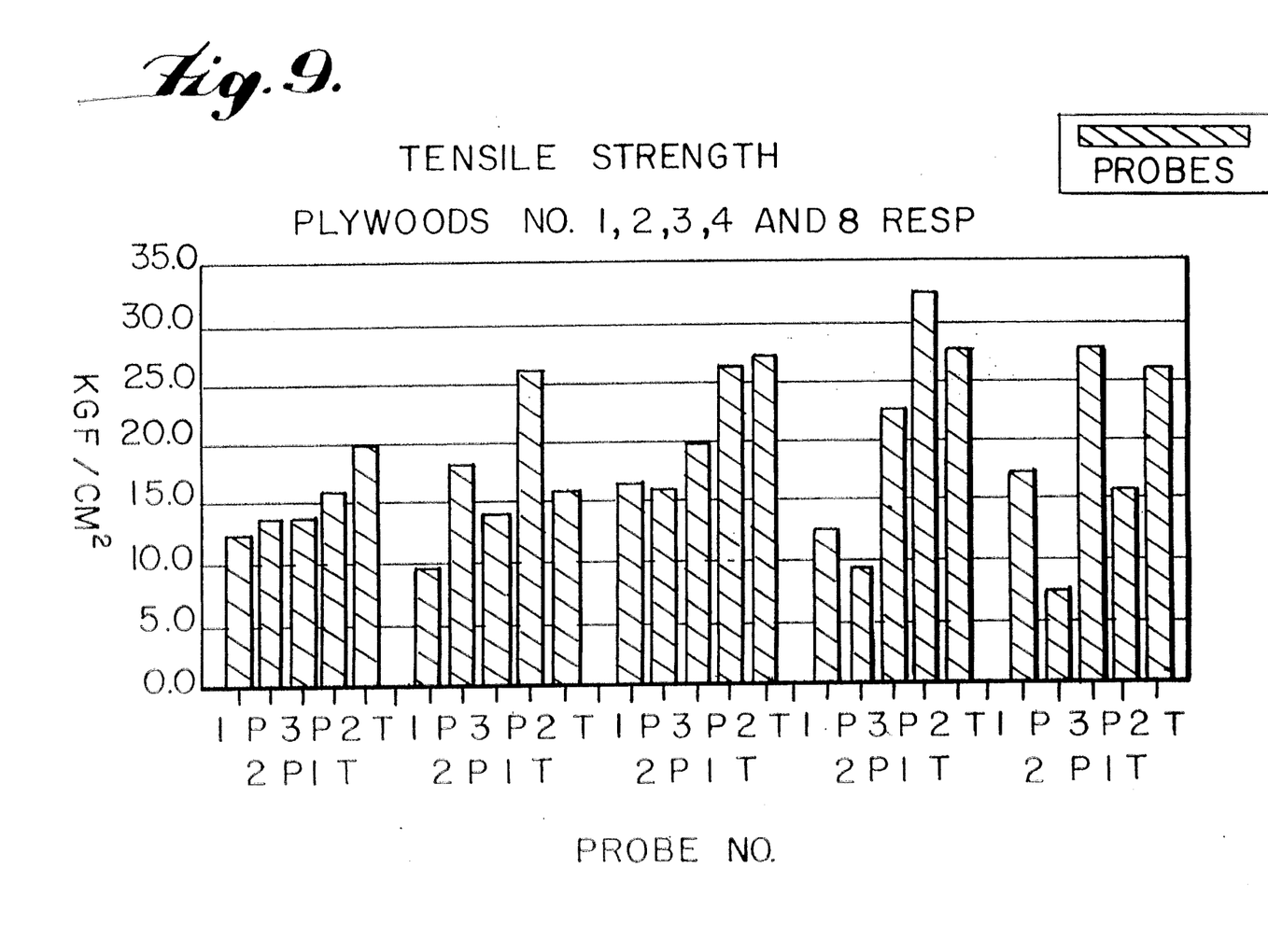
Figure 10:
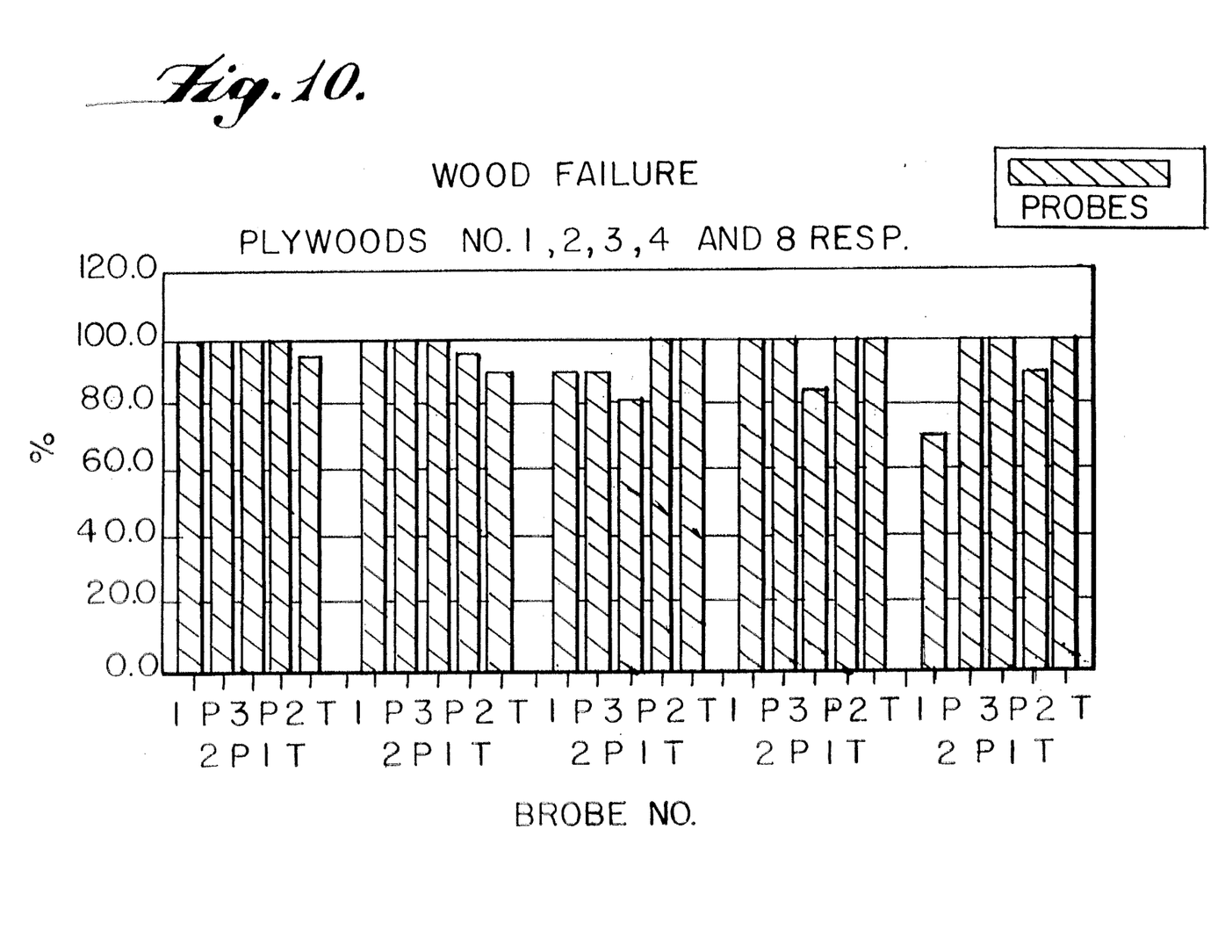

The shear resistance values and adhesive values for the plywoods are summarized in Table E and are plotted in FIGS. 5 and 6.

TABLE E

| | SUMKARY OF PROPERTIES | |
|---|---|---|
| PLYWOOD | SHEAR (N/mm$^2$) | ADHESIONS (%) |
| 1,1 (m) | 1.90 | 92.54 |
| 1,11 (n) | 1.97 | 91.51 |
| 1,70 (o) | 1.36 | 87.72 |
| 1,100 (p) | 1.65 | 72.33 |
| 2,1 (q) | 1.42 | 88.42 |
| 2,11 (r) | 1.35 | 91.00 |
| 3,1 (s) | 1.33 | 91.94 |
| 3,11 (t) | 1.29 | 93.25 |
| 4,1 (u) | 1.46 | 90.33 |
| 4,11 (v) | 1.53 | 91.67 |
| 4,70 (w) | 1.54 | 89.67 |
| 6,1 (x) | 1.59 | 83.17 |
| 6,11 (y) | 1.65 | 90.76 |
| 7,1 (z) | 1.48 | 84.04 |
| 7,11 (A) | 1.97 | 88.00 |
| 8,1 (B) | 1.87 | 84.92 |
| 8,11 (C) | 1.55 | 90.33 |
| 8,70 (D) | 1.52 | 73.56 |
| SIDE S | 1.53 | 85.75 |
| SIDE I | 1.63 | 86.52 |

It can be seen from the graphs that the shear values for all the plywoods are higher than 1N/mm$^2$ thus fulfilling the DIN standard and that the adhesive value are high with 85% of the boards assayed showing over 80% adhesion, thus achieving the APA standard. No unplyed probes or 0% adhesion was found.

INDUSTRIAL ASSAY 2

For this industrial assay, composition 1 of the example according to the invention was applied to tepa, coigue, ulmo, olivillo, and pine small tulips with thicknesses of 1.5, 2.2 and 4.0

The operating conditions are specified in Table F.

TABLE F

| PROCESS CONDITIONS | |
|---|---|
| ITEM | VALUE |
| Small tulip moisture (%) | 8-10 |
| Adhesive charge (g/m$^2$) | 200 |
| Previous Press Time (Min) | 6 |
| Press Time (Min) | 18 |
| Press Temperature (°C.) | 125 |
| Press Pressure (Kg/cm$^2$) | 11 |
| Previous Press Pressure (Kg/cm$^2$) | 10 |
| Open Time (Min) | 30-45 |

*By glue - line.

The shear strength and wood failure values are summarized in Tables G, H, I and J and are plotted in FIGS.

7, 8, 9 and 10. The wood failure values indicate the percentage of adhesiveness, with 100 representing the maximum percentage of adhesiveness and 0 representing no adhesiveness. These values were derived from a visual test performed in accordance with the APA standard.

As can be seen from the tables and graphs, the moisture of the boards as well as the adherence with vacuum-pressure as well as with boiling water and heat resistance, fulfill the corresponding standard.

TABLE G

| PLYWOOD N° | MOISTURE % |
|---|---|
| 01 | 9.1 |
| 02 | 9.7 |
| 03 | 9.5 |
| 04 | 9.1 |
| 08 | 9.7 |

PLYWOOD MOISTURE

The plywood moisture corresponds to average of five probes per plywood.

TABLE H

TRACTION SHEAR ASSAY - VACUUM-PRESSURE

| PLYWOOD N° | PROBE N° | | TENSILE STRENGTH KGF CM$^2$ | WOOD FAILURE * |
|---|---|---|---|---|
| 1 | 1 | P | 24.7 | 100 |
|   | 2 | P | 18.8 | 90 |
|   | 3 | P | 25.1 | 90 |
|   | 1 | T | 30.9 | 90 |
|   | 2 | T | 30.6 | 100 |
| 2 | 1 | P | 11.2 | 95 |
|   | 2 | P | 12.3 | 80 |
|   | 3 | P | 15.2 | 85 |
|   | 1 | T | 18.9 | 90 |
|   | 2 | T | 17.0 | 95 |
| 3 | 1 | P | 18.0 | 25 |
|   | 2 | P | 17.5 | 90 |
|   | 3 | P | 10.8 | 95 |
|   | 1 | T | 16.0 | 95 |
|   | 2 | T | 34.7 | 100 |
| 4 | 1 | P | 25.2 | 90 |
|   | 2 | P | 14.6 | 90 |
|   | 3 | P | 10.8 | 60 |
|   | 1 | T | 26.7 | 95 |
|   | 2 | T | 16.0 | 90 |
| 8 | 1 | P | 16.0 | 95 |
|   | 2 | P | 15.0 | 70 |
|   | 3 | P | 14.0 | 90 |
|   | 1 | T | 32.3 | 100 |
|   | 2 | T | 29.7 | 100 |

P means stress of the sheet parallel to the direction of the load and T, the transverse one.

TABLE I

TRACTION SHEAR ASSAY, BOILING WATER IMMERSION

| PLYWOOD N° | PROBE N° | | TENSILE STRENGTH KGF CM$^2$ | WOOD FAILURE * |
|---|---|---|---|---|
| 1 | 1 | P | 12.2 | 100 |
|   | 2 | P | 13.7 | 100 |
|   | 3 | P | 13.7 | 100 |
|   | 1 | T | 15.8 | 100 |
|   | 2 | T | 19.9 | 95 |
| 2 | 1 | P | 9.5 | 100 |
|   | 2 | P | 17.9 | 100 |
|   | 3 | P | 14.0 | 100 |
|   | 1 | T | 26.0 | 95 |
|   | 2 | T | 15.6 | 90 |
| 3 | 1 | P | 16.4 | 90 |
|   | 2 | P | 16.0 | 90 |
|   | 3 | P | 20.0 | 80 |

TABLE I-continued

TRACTION SHEAR ASSAY, BOILING WATER IMMERSION

| PLYWOOD N° | PROBE N° | | TENSILE STRENGTH KGF CM$^2$ | WOOD FAILURE * |
|---|---|---|---|---|
|   | 1 | T | 26.4 | 100 |
|   | 2 | T | 26.9 | 100 |
| 4 | 1 | P | 12.6 | 100 |
|   | 2 | P | 9.3 | 100 |
|   | 3 | P | 22.4 | 85 |
|   | 1 | T | 32.0 | 100 |
|   | 2 | T | 27.5 | 100 |
| 8 | 1 | P | 16.9 | 70 |
|   | 2 | P | 7.3 | 100 |
|   | 3 | P | 27.5 | 100 |
|   | 1 | T | 15.4 | 90 |
|   | 2 | T | 25.7 | 100 |

P means stress of the sheet parallel to the direction of the load and T, the transverse one.

TABLE J

HEAT RESISTANCE ASSAY

| PLYWOOD N° | AFTER FLAME EXPOSURE |
|---|---|
| 01 | N.F. |
| 02 | N.F. |
| 03 | N.F. |
| 04 | N.F. |
| 08 | N.F |

N.F.: Without failure.

PILOT PLANT ASSAY 2

Assays were performed in order to measure the "wood failure" in plywood manufactured using USA pinus and an adhesive mix according to the invention.

WORK CONDITIONS

Veneer: USA pinus species, such as loblolly pine (pinus taeda) and shortleaf pine (pinus echinata).
Veneer thickness: 4.3 mm (0,170 inch).
Veneer moisture content: Face and back =9 to 11 percent Core (center) =5 to 6 percent
Plywood assembly time: 30, 60, 90 min (includes a 4 minutes prepress at 1034 kPa pressure).
Adhesive spread: 224 g/m2 (46 pounds per 1000 ft2), single glue line basis.
Hot press conditions: Temperature =150° C. (302° F.) Pressure =1206 kPa (175 psi) Time =4 minutes
Replications: 4 panels per condition The control resin was a commercial plywood resin produced by Georgia Pacific Resins, Incorporated, and coded GP 5743. This resin is about 43 percent nonvolatile solids and is recommended for high moisture content veneer gluing (i.e, see enclosed mix).

The PMDI used in the PF/tannin/PMDI adhesive mix was Miles (Mobay) code Mondur 541.

The tannin in the PF/tannin/PMDI adhesive was from a Chile source bark extract mixture of pinus insignis and pinus radiata.

The phenol-formaldehyde resin in the PF/tannin/PMDI adhesive was a "conventional" type resin containing the following characteristics:

| CHARACTERISTIC | ACTUAL | SUGGESTED RANGE |
|---|---|---|
| Formaldehyde/phenol ratio | 1.86 | 1.5–2.5 |
| Sodium hydroxide/phenol ratio | 0.44 | 0.4–0.7 |
| Nonvolatile solids % | 43.3 | 35–45 |

| -continued | | |
|---|---|---|
| pH | 11.3 | 9.5–12 |
| Specific gravity | 1.184 | — |
| Gel time (at 100° C.), minutes | 29 | 20–30 |
| Alkalinity (titration method) % | 5.5 | — |
| Free formaldehyde, % | 0.1 | — |
| Viscosity (Brookfield), cp | 635 | 300–1200 |

The adhesive mix was as follows.

| | PARTS BY WEIGHT |
|---|---|
| Water | 11 |
| Extender (soft wheat flour) | 5.1 |
| Filler (pecan nut flour) | 7.8 |
| PF resin (43% nonvolatile) | 65.1 |
| Tannin | 4.0 |
| Paraformaldehyde | 0.5 |
| PMDI | 6.5 |
| | 100 |

The final moisture content of the plywood out of the hot press was 5.1 percent.

PLYWOOD TEST

Vacuum-pressure test per Unites States Product Standard PS 1-83 for construction and industrial plywood.

TABLE K

| PLYWOOD TEST RESULTS | | |
|---|---|---|
| TOTAL ASSEMBLY TIME (MIN) | WOOD FAILURE, PF/TANNIN/MDI | PERCENT GP-RESIN |
| 30 | 85 | 92 |
| 60 | 92 | 94 |
| 90 | 92 | 92 |

Each wood failure value is an average of four panels (1 test specimens per panel).

The entire contents of all references cited herein are hereby incorporated by reference.

While the foregoing invention has been described in some detail for purposes of clarity and understanding, it will be clear to one skilled in the art from a reading of this disclosure that various changes in form and detail can be made without departing from the true scope of the invention.

What is claimed is:

1. Adhesive composition for manufacturing plywood for exterior application comprising:
   a) 121 parts by weight phenolic resin containing a reactive methylol group;
   b) 5 to 121 parts by weight isocyanate;
   c) 1 to 40 parts by weight tannin selected from the group consisting of pine, quebracho, mimosa, and combinations thereof;
   d) 1 to 15 parts by weight paraformaldehyde or formaldehyde solutions in water;
   e) 5 to 50 parts by weight of water; and
   f) an amount of filler comprising inorganic and/or organic materials for providing the composition with the desired viscosity.

2. Adhesive composition according to claim 1, wherein said composition comprises 121 parts by weight of phenolic resin, 30 parts by weight of isocyanate (MDI), 10 parts by weight of pine tannin, 1 part by weight of paraformaldehyde, 10 parts by weight of wood flour and 17 parts by weight of water.

3. The adhesive composition according to claim 1, wherein the isocyanate is 5 to 50 parts by weight.

4. The adhesive composition according to claim 1, wherein the tannin is 1 to 10 parts by weight.

5. The adhesive composition according to claim 1, wherein the paraformaldehyde or formaldehyde solutions in water are 1 to 5 parts by weight.

6. The adhesive composition according to claim 2, wherein the filler is wood flour.

* * * * *